(12) United States Patent
Bossard et al.

(10) Patent No.: US 11,961,291 B2
(45) Date of Patent: Apr. 16, 2024

(54) VISUAL SEARCH FOR ELECTRONIC DEVICES

(71) Applicant: Apple Inc., Cupertino, CA (US)

(72) Inventors: Lukas A. Bossard, Cupertino, CA (US); Matthias Dantone, Cupertino, CA (US); Pulah J. Shah, Cupertino, CA (US); Wentao Wu, Cupertino, CA (US); Yang Zhao, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 227 days.

(21) Appl. No.: 17/528,157

(22) Filed: Nov. 16, 2021

(65) Prior Publication Data

US 2022/0335242 A1 Oct. 20, 2022

Related U.S. Application Data

(60) Provisional application No. 63/176,878, filed on Apr. 19, 2021.

(51) Int. Cl.

| | |
|---|---|
| *G06V 20/20* | (2022.01) |
| *G06F 18/40* | (2023.01) |
| *G06N 20/00* | (2019.01) |
| *G06Q 30/0601* | (2023.01) |
| *G06T 11/00* | (2006.01) |
| *G06V 10/25* | (2022.01) |
| *H04N 23/617* | (2023.01) |
| *H04N 23/63* | (2023.01) |
| *H04N 23/80* | (2023.01) |

(52) U.S. Cl.
CPC ............. *G06V 20/20* (2022.01); *G06F 18/40* (2023.01); *G06N 20/00* (2019.01); *G06Q 30/0625* (2013.01); *G06T 11/00* (2013.01); *G06V 10/25* (2022.01); *H04N 23/617* (2023.01); *H04N 23/635* (2023.01); *H04N 23/80* (2023.01)

(58) Field of Classification Search
CPC ........ G06V 20/20; G06V 10/25; G06N 20/00; H04N 23/635; H04N 23/80; H04N 23/617; G06F 18/40; G06Q 30/0625; G06T 11/00
USPC ...................................... 348/222.1
See application file for complete search history.

(56) References Cited

U.S. PATENT DOCUMENTS

| | | |
|---|---|---|
| 2015/0146927 A1 | 5/2015 | Cebron et al. |
| 2017/0090693 A1* | 3/2017 | Ku .................. G06F 3/04842 |
| 2019/0080171 A1* | 3/2019 | Zheng .................. G06F 18/214 |

OTHER PUBLICATIONS

Mark Jansen, https://www.digitaltrends.com/mobile/how-to-use-google-lens/, Mar. 29, 2019 (Year: 2019).*

(Continued)

*Primary Examiner* — Joel W Fosselman
(74) *Attorney, Agent, or Firm* — BAKERHOSTETLER

(57) ABSTRACT

The subject technology provides visual search systems and methods that can be used to efficiently perform visual searches on an electronic device. The subject technology provides systems and methods for presenting one or more visual indicators corresponding to the searchable portions of digital content. A visual search may include identifying, at an electronic device, an element of interest in an image. A visual indicator for the element of interest may be overlaid on the image at a location corresponding to the element of interest. The visual indicator may be selectable to cause a display of information associated with the element of interest responsive to the selection.

20 Claims, 10 Drawing Sheets

(56) References Cited

OTHER PUBLICATIONS

Digital Trands, https://www.youtube.com/watch?v=h_nYU9OVCZk&t=221s, Jun. 18, 2019 (Year: 2019).*

Hardwick, "iOS 15: How to Use Visual Lookup in Photos Identify Landmarks, Plants, and Pets," retrieved from https://www.macrumors.com/how-to/use-visual-lookup-photos-ios/, Jul. 8, 2021.

* cited by examiner

VISUAL SEARCH FOR ELECTRONIC DEVICES

CROSS REFERENCE TO RELATED APPLICATIONS

This application claims the benefit of priority to U.S. Provisional Patent Application No. 63/176,878, entitled "VISUAL SEARCH FOR ELECTRONIC DEVICES," filed on Apr. 19, 2021, the disclosure of which is hereby incorporated herein in its entirety.

TECHNICAL FIELD

The present description generally relates to machine learning, including, for example, using machine learning for visual searching for electronic devices.

BACKGROUND

Software engineers and scientists have been using computer hardware for machine learning to make improvements across different industry applications including visual search for electronic devices.

BRIEF DESCRIPTION OF DRAWINGS

Certain features of the subject technology are set forth in the appended claims. However, for purpose of explanation, several embodiments of the subject technology are set forth in the following figures.

DETAILED DESCRIPTION

Figure 1:
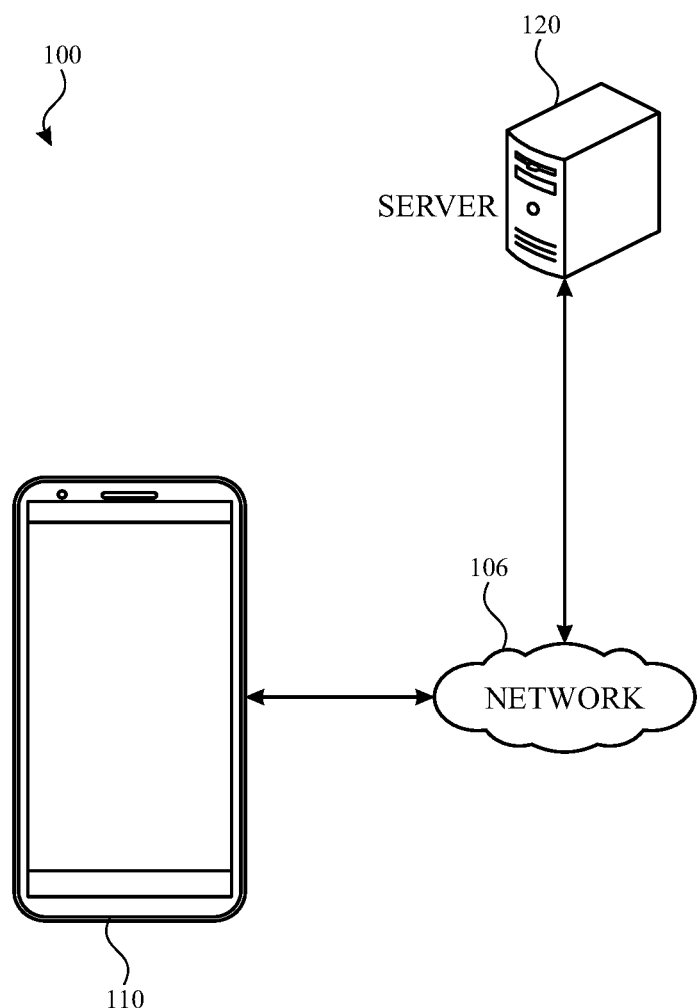
FIG. 1 illustrates an example network environment in accordance with one or more implementations of the subject technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Users all across the globe rely heavily on computing devices, for example, smartphones, for activities such as communications or viewing content, and for performing various day to day tasks. Amongst these activities, viewing digital content, for example, images, videos, and capturing images using the smartphones, are some of the popular functions used by users.

With advancements in image processing techniques and machine learning, some applications at computing devices are capable of identifying objects in images that are provided to or generated by the application. However, the utility of such applications can be limited in that the object identification can only be performed by that dedicated application, which is separate from the applications (e.g., browser applications, social media applications, etc.) typically used by the user to view images. In order to seek information about the content of an image, the user may separately perform their own text-based search for the content, for example, in a browsing application, or separately load the image into an object recognition application. In such instances, the user's experience of viewing the content may be hampered by the time and effort of switching applications.

For example, consider a case where a user is viewing a photo album including multiple images on the user's device. In such a scenario, the user may feel inquisitive about objects present in one or more of such images. In some scenarios, for each such object, the user may separately perform the search in the browser application, thereby reducing the efficiency of the overall content viewing experience.

In one or more implementations, the subject technology provides system processes that can generate visual indicators of visual search results that can augment digital content, such as an image or a video, that is displayed by any application running at a device. The visual indicators may be selectable to present information to users about various elements of interest such as objects and scenes included in the image or video. The information may include, for example, what the element of interest is, its type, and/or a synopsis or a description about the element of interest, a selectable element (e.g., a link to buy or download) associated with the element of interest. These visual indicators may be provided in any shape, size or form to visually indicate elements of interest in the image or video. A user seeking to acquire information regarding an element of interest in an image may select a visual indicator corresponding to that element of interest to obtain the information related to that element of interest, without having to separately navigate to a web browser or another application to conduct a search (e.g., and then, potentially, sort through thousands or millions of search results in an attempt to acquire information related to the object).

In the following description of the exemplary implementations of the subject technology, reference is made to the accompanying drawings, which form a part hereof, and in which is shown by way of illustration specific implementations in which the subject technology may be practiced. It is understood that other implementations may be utilized, and structural changes may be made without departing from the scope of the present invention.

FIG. 1 illustrates an example network environment 100 in accordance with one or more implementations of the subject technology. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes a computing device 110 (interchangeably referred to as an electronic device), and a server 120. The network 106 may communicatively (directly or indirectly) couple the computing device 110 and/or the server 120. In one or more implementations, the network 106 may be an interconnected network of devices that may include, or may be communicatively coupled to, the Internet. For explanatory purposes, the network environment 100 is illustrated in FIG. 1 as including the computing device 110, and the server 120; however, the network environment 100 may include any number of electronic devices and any number of servers.

The computing device 110 may be, for example, a desktop computer, a portable computing device such as a laptop computer, a smartphone, a peripheral device (e.g., a digital camera, headphones), a tablet device, a wearable device such as a watch, a band, and the like. In FIG. 1, by way of example, the computing device 110 is depicted as a smartphone. The computing device 110 may be, and/or may include all or part of, the system discussed below with respect to FIG. 8.

In one or more implementations, the computing device 110 may provide a system for training a machine learning model using training data, where the trained machine learning model is subsequently deployed locally at the computing device 110. Further, the computing device 110 may provide one or more frameworks for training machine learning models and/or developing applications using the machine learning models. In an example, the computing device 110 may be a user electronic device (e.g., smartphone) that displays an image with a visual indicator positioned on an element of interest in the image. The computing device 110 may communicate with a server 120 (e.g., a back-end server) for processing the image using one or more machine learning models to obtain additional information related to the element of interest responsive to the selection of the visual indicator.

In an implementation, the server 120 may train one or more machine learning models for deployment to a client electronic device (e.g., the computing device 110). In other implementations, the server 120 may provide a system for training a machine learning model using training data, where the trained machine learning model is subsequently deployed locally at the server 120. The machine learning model may be deployed on the server 120 and/or the computing device 110 may then perform one or more machine learning algorithms. In an implementation, the server 120 may provide a cloud service that utilizes the trained machine learning model and is continually refined over time.

In an example implementation, the computing device 110 may include a system process which may be configured to obtain an image being displayed by an application at the computing device 110. As an example, a user of the computing device 110 may be viewing the image in a gallery application. In another example, without limitation, the term image may include a preview frame being rendered by a camera application on the display of the computing device 110. Thus, the system process may obtain the image being displayed by any application on the computing device 110.

Subsequently, the system process of the computing device 110 may be configured to provide the obtained image to a machine learning model. The obtained image may be processed by the machine learning model. The machine learning model may be configured to detect at least one element of interest in the image and provide the identified element of interest as output. Without limitation, the term "element" as used herein may include one or more objects included in the image, one or more regions in the image, text of interest in the image, or the complete image itself. Such objects may be, for example, humans, animals, products, a tree, text, automobiles, apparels, music, artwork, software, accessories, artifacts, scenes, landmarks, etc. The element of interest may be understood as an element that may be of interest to the user and about which the user may seek to obtain information.

As an example, consider an image which includes a car. In said example, the machine learning model may identify the car as the element of interest and accordingly may provide indication of the identified element of interest as output. The machine learning model may also identify other elements of interest in the image of the car, such as a wheel of the car or a sticker, a license plate number, a phone number, or a business logo on the car. In an example, the system process of the computing device 110 may obtain information associated with the element of interest. In an example, the information may include what the element of interest is (e.g., a car in the above example), its type, a synopsis or a description about the element of interest, and/or a selectable element (e.g., a link to buy or loan a car in the above example, or download software or music in other examples) associated with the element of interest etc.

The system process of the computing device 110 may subsequently be configured to display a visual indicator for the element of interest overlaid on the image at a location corresponding to the element of interest. In an example, the visual indicator may be selectable to cause display of the obtained information. Thus, when the user selects the element of interest, the information is displayed on a display of the computing device 110.

The visual indicator may be arranged in different shapes, sizes and forms. In some examples, visual indicator may be a dot, an arrow, a bounding box or rectangle, a question mark, or a combination thereof. In other examples, visual indicator may be in any suitable visual form capable of providing an indication to the user or drawing user's attention to element of interest on the image. The visual indicator may be positioned at or around the element of interest or at another suitable position visibly locatable by the user.

Figure 2:
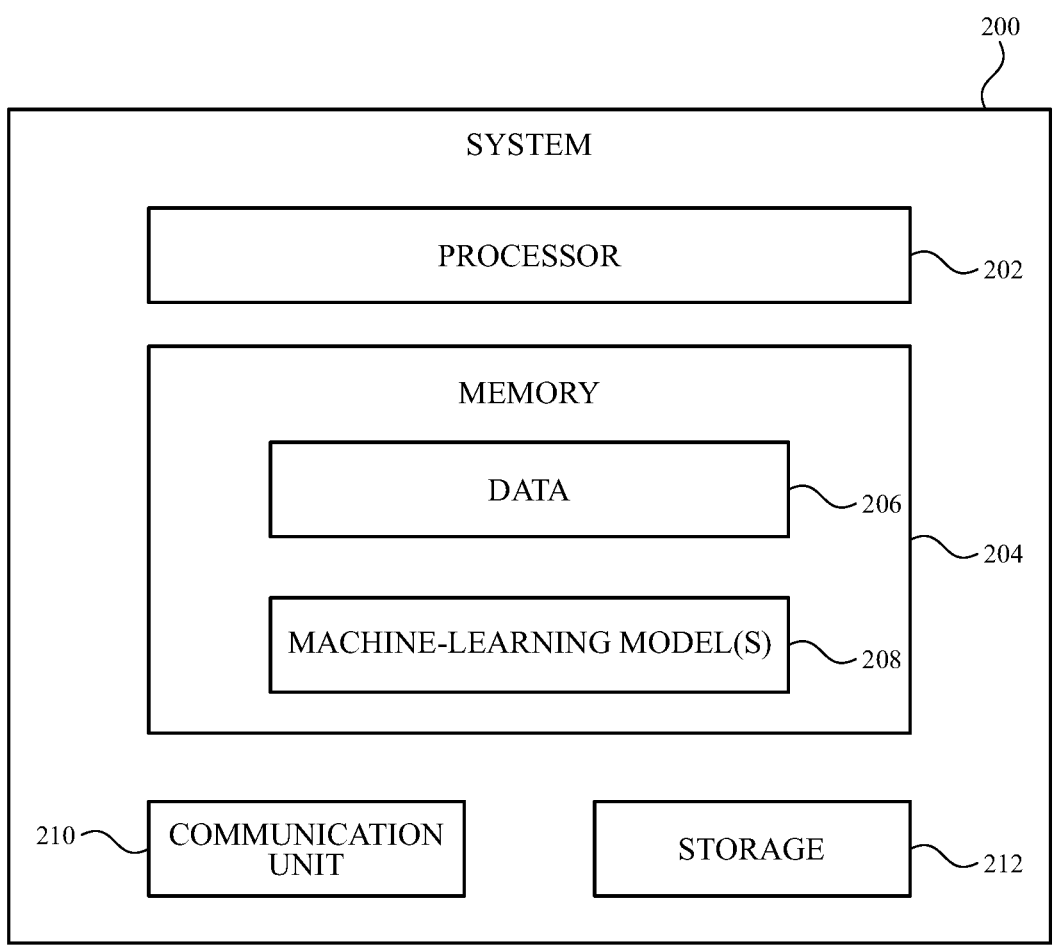
FIG. 2 illustrates an example system in accordance with one or more implementations of the subject technology.

FIG. 2 illustrates an example system 200 in accordance with one or more implementations of the subject technology. In an example, the system 200 may be implemented in computing devices, such as the computing device 110. In another example, the system 200 may be implemented either in a single device or in a distributed manner in a plurality of devices, the implementation of which would be apparent to a person skilled in the art.

In an example, the system 200 may include a processor 202, memory 204 (memory device) and a communication unit 210. The memory 204 may store data 206 and one or more machine learning models 208. In an example, the system 200 may include or may be communicatively coupled with a storage 212. Thus, the storage 212 may be either an internal storage or an external storage.

In an example, the processor 202 may be a single processing unit or a number of units, all of which could include multiple computing units. The processor 202 may be implemented as one or more microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The data 206 may represent, amongst other things, a repository of data processed, received, and generated by one or more processors such as the processor 202. One or more of the aforementioned components of the system 200 may send or receive data, for example, using one or more input/output ports and one or more communication units.

The machine learning model(s) 208, in an example, may include one or more of machine learning based models and artificial intelligence-based models, such as, for example, neural network models, or any other models besides the aforementioned. In an example, the machine learning model(s) 208 may be trained model(s), which are trained based on training data (not shown) and are implemented by the processor 202 for performing the operations and steps, as described herein.

In an example, the communication unit 210 may include one or more hardware units that support wired or wireless communication between the processor 202 and processors of other computing devices.

In an example, a user may view an image using the computing device 110. The image in an example may be stored in the storage 212. The user may view the image in an image viewing application of the computing device 110. In another example, the application may be web browsing application and the image may be an image displayed therein. In another example, the image may include a live preview of a field of view, as captured by a camera of the computing device 110. According to an implementation of the present subject technology, the processor 202 may be configured to obtain the image being displayed by the application on the computing device 110. For example, the processor 202 may determine that an image is being displayed or is about to be displayed by an application running at the computing device, and may provide the image and/or a portion thereof to one or more of the machine-learning models 208.

On obtaining the image, the processor 202 may be configured to identify one or more elements of interest in the image (e.g., by providing the image to one or more of the machine-learning models 208) and display one or more visual indicators corresponding to the identified one or more elements of interest, at or near a location of the corresponding elements of interest. The one or more visual indicators are selectable and may be selected by the user to obtain information corresponding to a selected visual indicator. This information may be information obtained by the processor 202, for example, using a local search at the device and/or a search at a remote server (e.g., a backend server). The information may include a description or a synopsis of one or more elements of interest identified by the machine-learning models (e.g., generated using data 206 stored at the computing device), other bibliographic details related to the elements of interest, one or more selectable elements such as links to other websites or webpages for obtaining further information about the elements of interest. In an example, for an element of interest 'painting', the information may include brief description about the painting, creator, when the painting was created, genre, country of origin, purchase link, link to other webpages for more information about the painting. In another example, for an element of interest 'food item', the information may include brief description of the food item, country of origin, its ingredients, link to order the food item, recommendations of other similar food items, etc. In an example, the processor 202 may trigger a digital assistant of the computing device 110 for obtaining the information.

Referring to the above, in an implementation, the processor 202 may be configured to identify the elements of interest in the image. To that end, the processor 202 may be configured to implement one or more prediction models of machine-learning models 208. These prediction models may include one or more machine learning models and other models, as applicable according to the implementation. For example, a smart camera model may be implemented to detect any text, if present, in the image. An object detector may be implemented for identifying objects present in the image. In other examples, a gating model, also referred to herein as a coarse-classification model, may be implemented to classify the objects present in the image. In yet another example, a scene classification model may be implemented to detect and classify the scene depicted in the image. Thus, by implementing the prediction models, the processor 202 may determine various types of elements or interest and extracted features, information, and/or signals.

Referring to the above, in an example, the processor 202 may be configured to identify elements in the image using one or more or machine learning models 208. In an example, if the processor 202 does not implement the object detector, the complete image may be taken as an element.

Once the elements are identified, the processor 202 may be configured to rank the elements based on a predetermined ranking algorithm, such as an object ranking algorithm. The ranking algorithm may assign a rank to each of the elements based on predefined parameters, such as visual and/or contextual relevance of an element in the image/scene, placement of the element in the image/scene, type of element, interaction history, popularity of the element, etc. In one or more implementations, the ranking algorithm may be a weighted ranking algorithm that calculates weights associated with the predefined parameters and assign ranks to the elements according to the calculated weights. In an example, based on the assigned ranks, the processor 202 may be configured to determine at least one element that may be of interest (referred to as element of interest herein) to a user from the identified elements. For the element of interest, a corresponding visual indicator is displayed at or near the position of the element of interest.

In one or more implementations, the processor 202 may be configured to determine the at least one element of interest, based on a domain of the at least one element. Examples of domains may include, but are not limited to, nature, artwork, animals, automobiles, landmarks, and media. In said example implementations, the processor 202 may be configured to determine the one or more domains associated with each of the elements, using the one or more machine learning models. Subsequently, the processor 202 may be configured to rank the one or more domains for each of the regions based on a predetermined ranking algorithm, such as a domain ranking algorithm. The ranking algorithm may assign a rank to each domain based on predefined parameters, such as type of domain, popularity of the domain, commonly used domains, favorite domains, contributing domains associated with the domain, etc. In one or more implementations, the ranking algorithm may be a weighted ranking algorithm that calculates weights associated with the predefined parameters and assign ranks to the domains according to the calculated weights. With the domains and their ranks available, the processor 202 may be configured to determine the at least one element of interest based on ranks associated with the elements and ranks associated with the one or more domains corresponding to each of the elements.

In an example implementation, the at least one element of interest may be an element whose rank is within a predetermined prominent element ranking range. For instance, consider a case where there are 20 objects in an image and the prominent element ranking range is of 10 elements. Thus, elements with ranks 1-10 would be selected as the elements of interest. In an example, the prominent element ranking range is user and/or machine configurable. By implementing selection of the element of interest based on the prominent element ranking range, the processor 202 is able to, for example, filter out the corner regions of the image which may include elements that may be of low interest to the user.

Prior to displaying the visual indicator corresponding to the at least one element of interest, the processor 202 may be further configured to perform a prediction, for example, by running or implementing all the domain models that are applicable on the one or more domains associated with the at least one element of interest. Examples of the domain models may include, but are not limited to, nature models, art, animals, and media models. Based on the domain model outputs, the processor 202 may determine whether a search based on the at least one element of interest can be performed or not. Accordingly, in case the processor 202 determines that the search may be conducted, the processor 202 may display the visual indicator corresponding to the at least one element of interest. In case of multiple elements of interest, the visual indicators would be displayed only for those elements which are searchable.

Subsequent to the prediction, the processor 202 may be configured to display at least one visual indicator corresponding to the element of interest on a display of the computing device 110. The displaying may be performed such that the visual indicator is displayed (e.g., overlaid on the image) at or around a location of the element of interest in the image. In the case where the image is the live preview from the camera, the visual indicator may be in the form of an annotation over the live preview at or around the location associated with the element of interest in the field of view of the camera (e.g., and may be moved with the element of interest in the preview field). As described, the visual indicator is selectable and upon selection thereof, the processor 202 may be configured to display the information corresponding to the element of interest.

In an example implementation, besides obtaining the image, the processor 202 may also obtain one or more of the following as additional inputs. For instance, the processor 202 may obtain a list of domains, an element of interest selected by the user, and/or OCR from media analysis daemon. In one or more implementations, the processor 202 may process the image based on additional inputs. In an example, the processor 202 may consider only those domains for ranking that are listed in the list of domains. In another example, the processor 202 may crop the image based on the element of interest selected by the user, and only this cropped portion of the image that includes the element of interest may be considered for further operations as described above. In an example, if the element of interest is an object, such object may be selected by a tapping onto the object. In another example, if the element of interest is a region of interest (ROI), for example, a scene or a region including one or more objects, such ROI may be selected by user based on drawing a bounding box around the region.

On displaying the visual indicators, in an example implementation, the processor 202 may be configured to detect a user action associated with the at least one visual indicator. The user action, without limitation, may include a touch input, a hovering input, etc., at or near the location of the visual indicator. In response to detecting the user action, the processor 202 may be configured to initiate a search based on the at least one element of interest at the computing device 110 and/or a server.

As described herein, the processor 202 may be configured to predict whether the search can be performed at the server. For instance, the processor 202 may implement the domain models to ascertain whether the search is possible or not. Accordingly, in case the search is possible, the processor 202 may be configured to then initiate the search, based on the user action.

As a part of initiating the search, domain models for the applicable regions, e.g., regions corresponding to elements with ranking falling in the prominent element ranking range, may be run. Thereafter, all the elements of interest and their corresponding domains may be post-processed on the computing device 110. For example, in one or more implementations, server-side ranking may be performed. For server-side ranking, some or all signals (e.g., signals associated with elements of interest detection, domain identification, etc.) that were extracted on the computing device 110 may be included in the search request. In one or more implementations, client-side ranking may also, or alternatively, be performed. For client-side ranking, post processing logics, such as cross-domain ranking, filtering, for example, based on additional inputs, described above, etc. may be performed. Thus, in an example implementation, the obtaining of the information may be based on the ranks corresponding to the elements of interest and/or the ranks assigned to the one or domains corresponding to the elements of interest.

Once some of the operations described above (e.g., prediction, identification of domains and ranking, etc.) are performed, the processor 202 may generate a search query that may be transmitted to the server using the communication unit 210. The server may be configured to search in the index roots, retrieve all the metadata and generate card information. Herein, card information is the information associated with the element of interest that is to be provided to the computing device 110. The detailed operation of the search at the backend or server is explained further in conjunction with FIG. 3.

In an example, the server may transmit the results of the search to the computing device 110. In said example, the processor 202 may be configured to obtain the information associated with the at least one element of interest in response to the search initiated at the server, from the server. Accordingly, the processor 202 may then cause display of the information responsive to selection of the least one visual indicator. In an example, the information may be displayed in the form of a card on the display.

Figure 3:
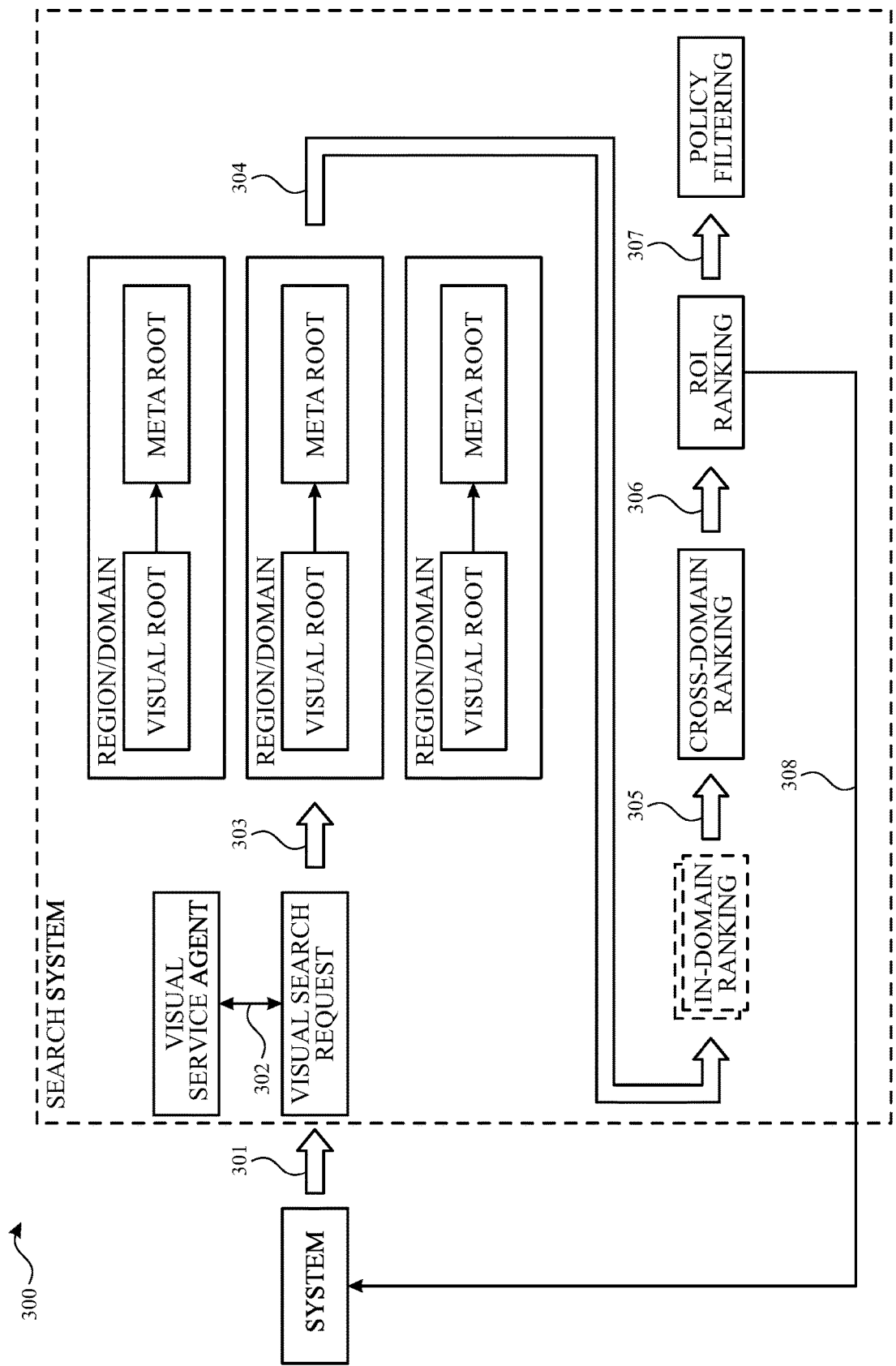
FIG. 3 illustrates an example prediction flow in accordance with one or more implementations of the subject technology.

FIG. 3 illustrates an example prediction flow 300 implemented by the system 200 in accordance with one or more implementations of the subject technology. In an example, the prediction flow includes operations 301 to 305, as described below.

In operation 301, an input image is provided to prediction models. As described herein, the prediction models may include one or more machine learning models, object detection models, scene classification models, and gating models at the system 200 (e.g., at the computing device 110). By providing the input image to the prediction models, elements of interest (objects or region of interest) may be determined.

In operation 302, one or more domains may be assigned to each of the elements of interest. In an example, the whole image may be taken as an element of interest. In said example, one or more domains may be assigned to the complete image. For instance, consider an image of an oil painting depicting a nature setting hanging on a wall of a room. For such image, the whole image may be determined as an element of interest, and domains such as 'art domain' and 'nature domain' may be assigned to that image. In another example, there may be one or more elements of interest in the image. In said example, for each of the elements of interest, one or more corresponding domains may be assigned. For instance, consider an image in which a dog is sitting near a pine tree. For such image, 'dog' and 'pine tree' may be determined as elements of interest, the domains such as 'animal' and 'pets' may be assigned to the element of interest 'dog', and domains such as 'plants' and 'nature' may be assigned to the element of interest 'pine tree'.

In operation 303, region selection may be performed, whereby elements in the predetermined prominent element ranking range may be identified. For example, in an image with 10 elements of interest, only 5 elements of interest may be selected for display. The selection may be based on the predetermined prominent element ranking range, which in this example is 1-5. Thus, elements of interest having ranks 1 to 5 may be selected for display.

In operation 304, the selected regions may be provided as an input to one or more domain models for prediction and in operation 305, the domain models may be implemented or executed for prediction. In an example, the domain models may correspond to the domains corresponding to the elements of interest. The execution of the domain models and subsequent thereto, its output, helps in ascertaining whether a given element and associated domain is to be searched at the server or not.

In one or more implementations, the prediction flow described with reference to FIG. 3 may be performed to generate information to be associated with visual indicators and to generate query information (e.g., region information, domain information, etc.) to be provided to a server for performing the query flow operations, which are described below in conjunction with FIG. 4.

Figure 4:
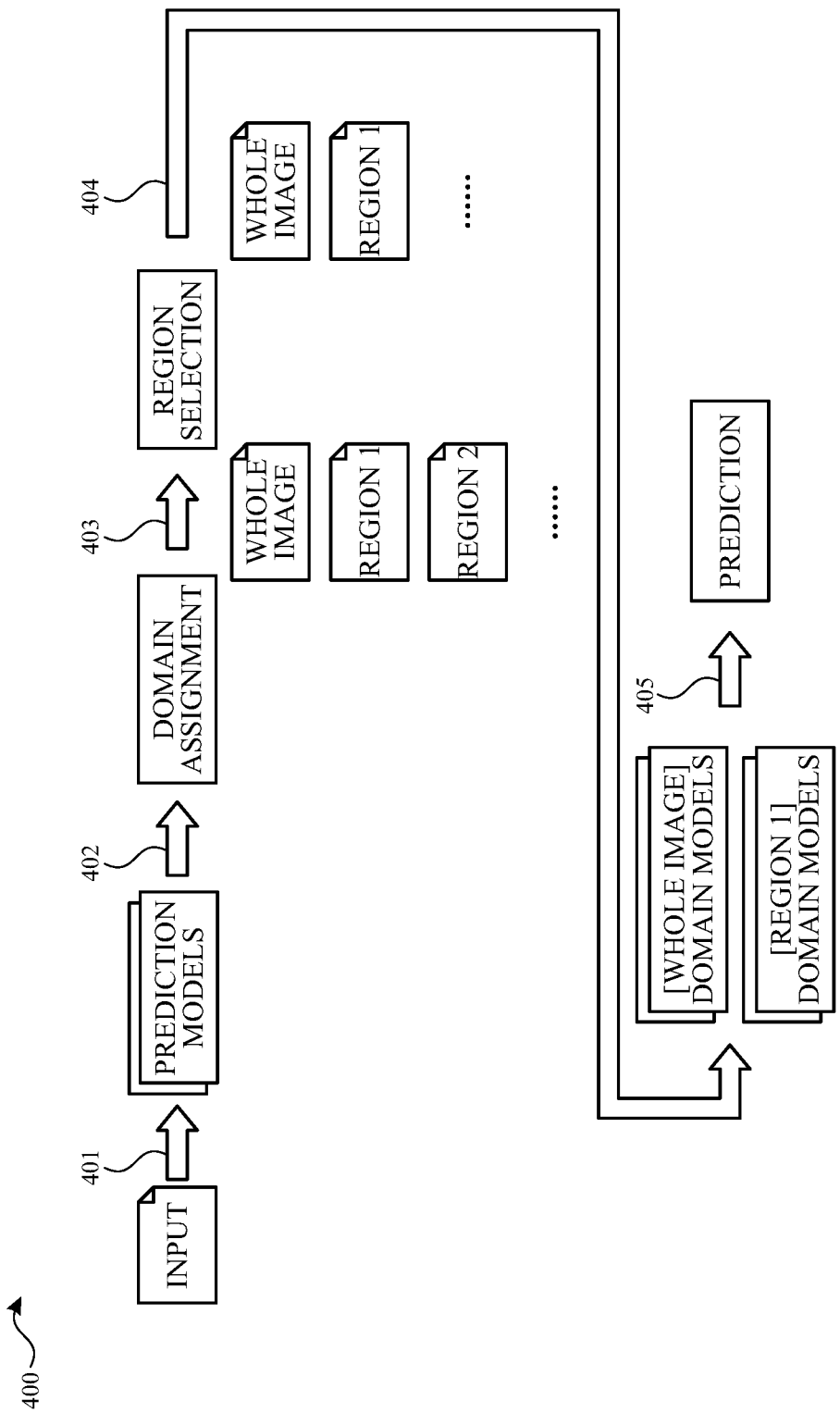
FIG. 4 illustrates an example query flow in accordance with one or more implementations of the subject technology.

FIG. 4 illustrates an example query flow 400 in accordance with one or more implementations of the subject technology. In an example, the query flow 400 may be implemented at the server for servicing search requests received from the system 200 implemented in the computing device 110. In an example, the query flow 400 includes operations 401 to 408, as described herein below.

In operation 401, a search request or query is generated by the system 200 (e.g., computing device 110). As described herein, the query may include information (e.g., object information, region information, domain information, prediction result, etc.) obtained at the computing device 110. In an example, a search query for an image depicting a dog sitting in a park having flowers in the background may include, for example, 'dog' and 'flowers' as object information, 'park' as region information, 'animals' and 'nature' as domain information, and prediction result that the search can be conducted on the backend server). In operation 402, the search system is configured to receive the request and connect to visual service agent, which may be understood as a search engine to get visual search results. In one or more implementations, the visual service agent is integrated into the system 200 (e.g., computing device 110).

In operation 403, the visual service agent is configured to send a request to each domain's visual root for a visual search of the received image and/or a portion thereof, to obtain search results within that domain. The term 'visual root' as used herein may be understood as a root storage/directory/folder containing visual files/data associated with a domain. Furthermore, requests are also sent to each meta root to retrieve metadata. The term 'meta root' as used herein may be understood as a root storage/directory/folder containing metadata files associated with a domain. In an example, if an element of interest has multiple domains associated therewith, then a request is sent to each of the domains. In an example, both, visual root and meta root retrieval are optional. For example, in the case of media domain, visual root may be queried for recognition and meta root may be queried for filing in the card information. For shopping domain, only shopping visual root may be queried as all the metadata is already available.

In operation 404, the domains may be re-ranked based on the information available from the visual root and meta root. Thereafter, at operation 405, for each element of interest with multiple domains, results from the domains are ranked based on, for example, retrieved results from visual roots and meta roots, and contextual information extracted on-device, for example, using gating model.

In operation 406, the different ROIs or different elements of interests may be ranked based on user's historical data, such as user's preferences, favorites, most searched elements, etc., followed by suppression or filtering of results based on, for example, predefined policy filtering criteria, in operation 407. Subsequently, at operation 408, the ranked results are returned back to the search UI.

Figure 5:
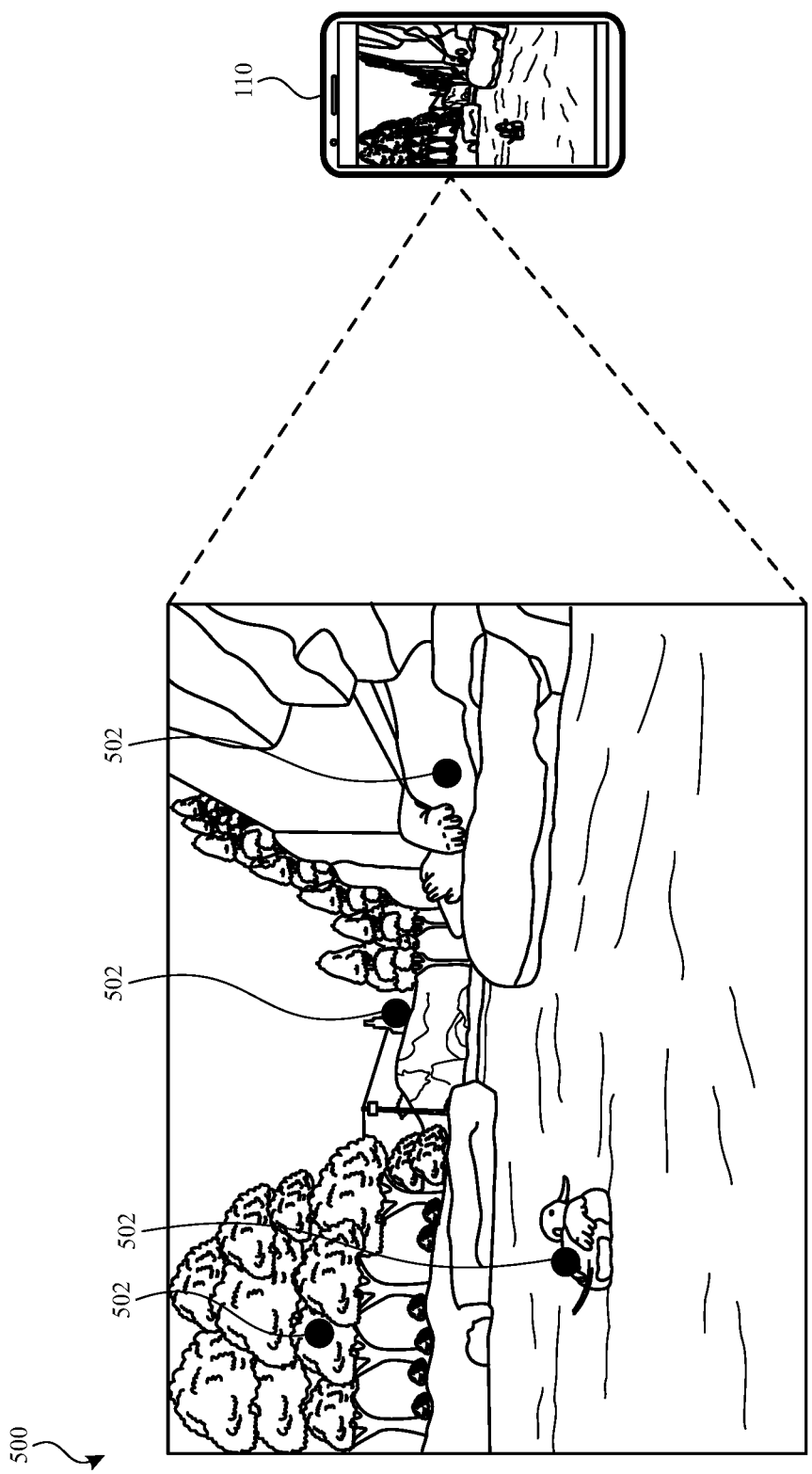
FIG. 5 illustrates an example image in accordance with one or more implementations of the subject technology.

FIG. 5 illustrates an example image 500 in accordance with one or more implementations of the subject technology. In an example, the image 500 may be displayed on a display of the computing device 110. In an example, the image 500 may be a still image, and may be stored in an internal storage of the computing device 110. In another example, the image 500 may be stored on a cloud storage that is accessible using the computing device 110. In an example, when the user opens the image 500, in an application on the computing device 110 (and/or on a live camera view), the user is presented with one or more visual indicators 502. On selecting a visual indicator, the computing device provides information about the element corresponding to the selected visual indicator. The computing device may generate and/or otherwise obtain the information about the elements prior to displaying the visual indicators 502 and/or responsive to a user interaction with the visual indicators, as described herein.

Figure 6:
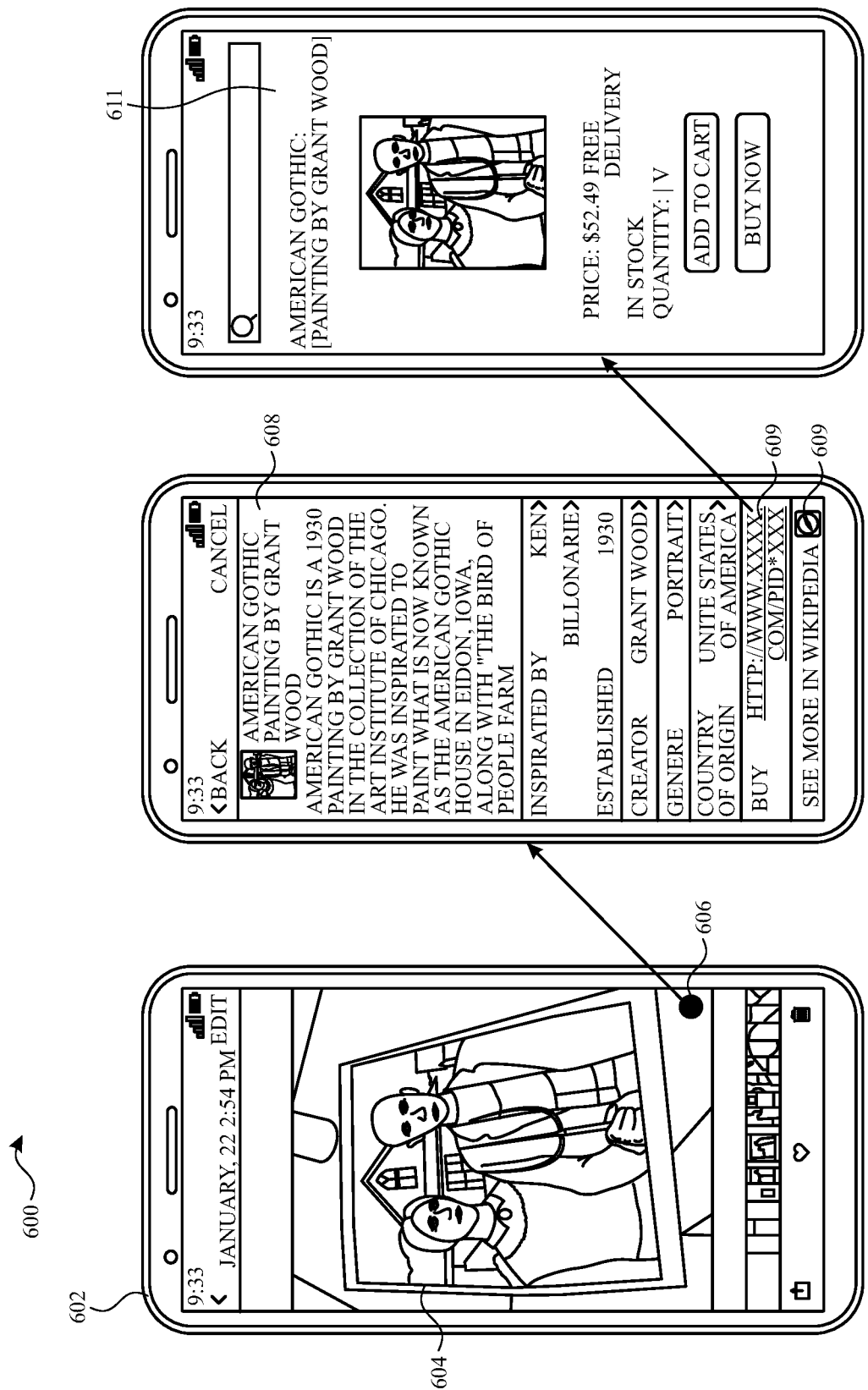
FIGS. 6-8 illustrate example use cases in accordance with one or more implementations of the subject technology.
Figure 7:
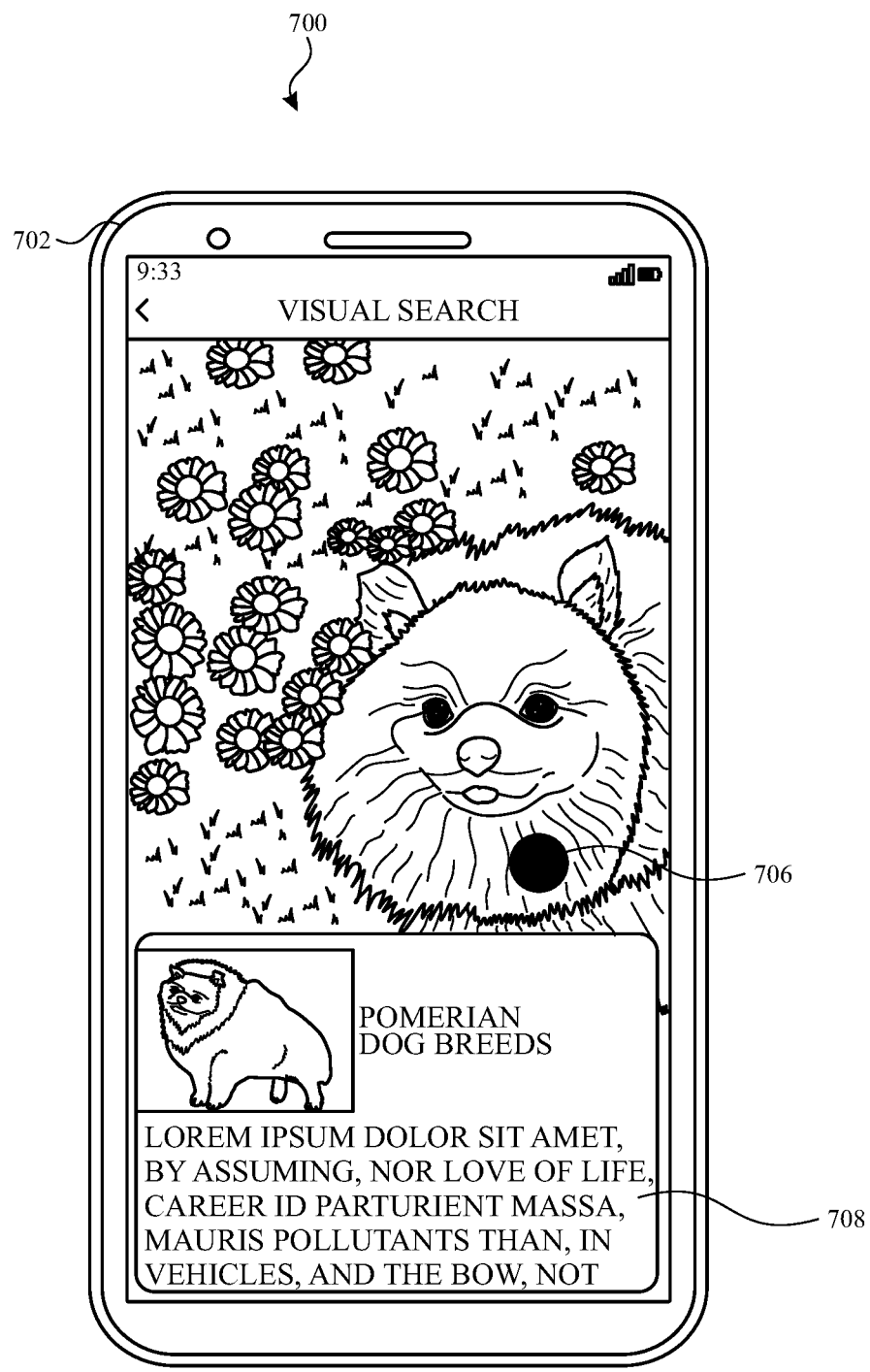
Figure 8:
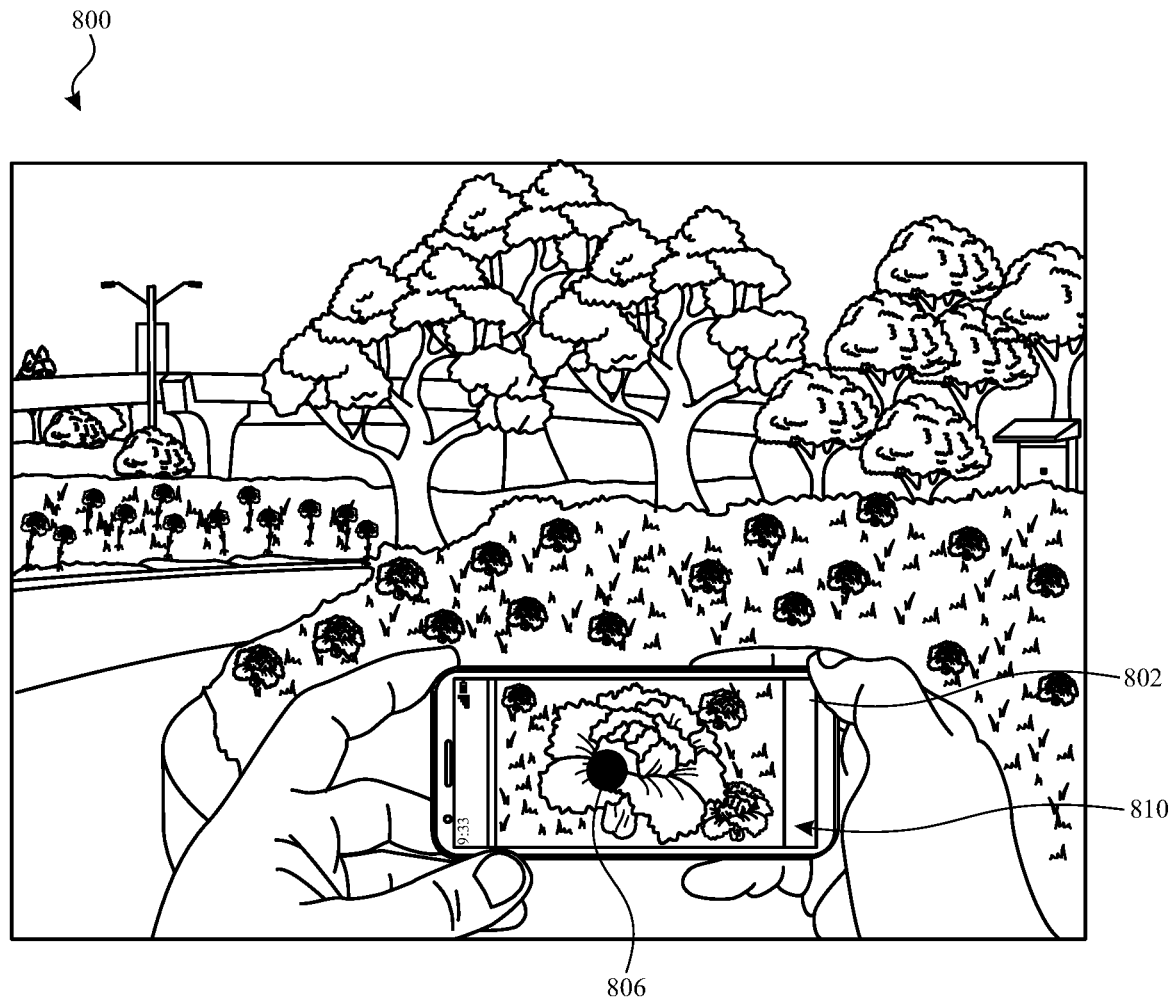

FIGS. 6-8 illustrate use cases 600, 700, and 800, respectively, according to some implementations of the subject technology. As shown in FIG. 600, on a computing device 602 (e.g., an implementation of electronic device 110), a user may view an image 604. In this use case, the whole image 604 may be determined by the computing device 602 to be an element of interest. Accordingly, a visual indicator 606 corresponding to the complete image 604 (i.e., image of a painting in this example) is shown. In an example, on selecting the visual indicator 606, the user may be presented with information 608 corresponding to the content of the image 604 and based on a visual search operation performed by the computing device 602. As shown, the information 608 may include description of the element of interest (e.g., painting) and one or more selectable elements 609 (e.g., a link), which upon selection causes display of another application 611 (e.g., an e-commerce application) listing the element of interest for purchase.

In the use case 700 shown in the FIG. 7, the image may include one or more visual indicators 706 positioned on the image at the location of an identified element of interest (e.g., a Pomeranian in the example of FIG. 7). On selection of a particular visual indicator 706, the corresponding information 708 (e.g., about Pomeranians in this example), obtained by the computing device 702 (e.g., an implementation of electronic device 110) using the visual search operations described herein, may be displayed to the user. In the use case 800 shown in the FIG. 8, a live preview 810 of a field of view of a camera of the computing device 802 (e.g., an implementation of electronic device 110) may be rendered on the display. In said implementation, the visual indicator 806 is annotated (e.g., overlaid) onto the element of interest present in the live preview 710.

In another use case (not shown), a user may be viewing an image that depicts a man wearing shoes sitting on a chair eating a fast food item. In this use case, the sneakers and the fast food item may be determined to be elements of interest, and visual indicators corresponding to these elements of interest may be displayed onto the image. In an example, on selecting the visual indicator corresponding to sneakers, the user may be presented with information related to the sneakers and further presented with a link to buy the sneakers via, for example, the manufacturer's website and/or application. In another example, on selecting the visual indicator corresponding to the fast food item, the user may be presented with information related to the fast food item and/or presented with a link (or other information) to order the fast food item.

Figure 9:
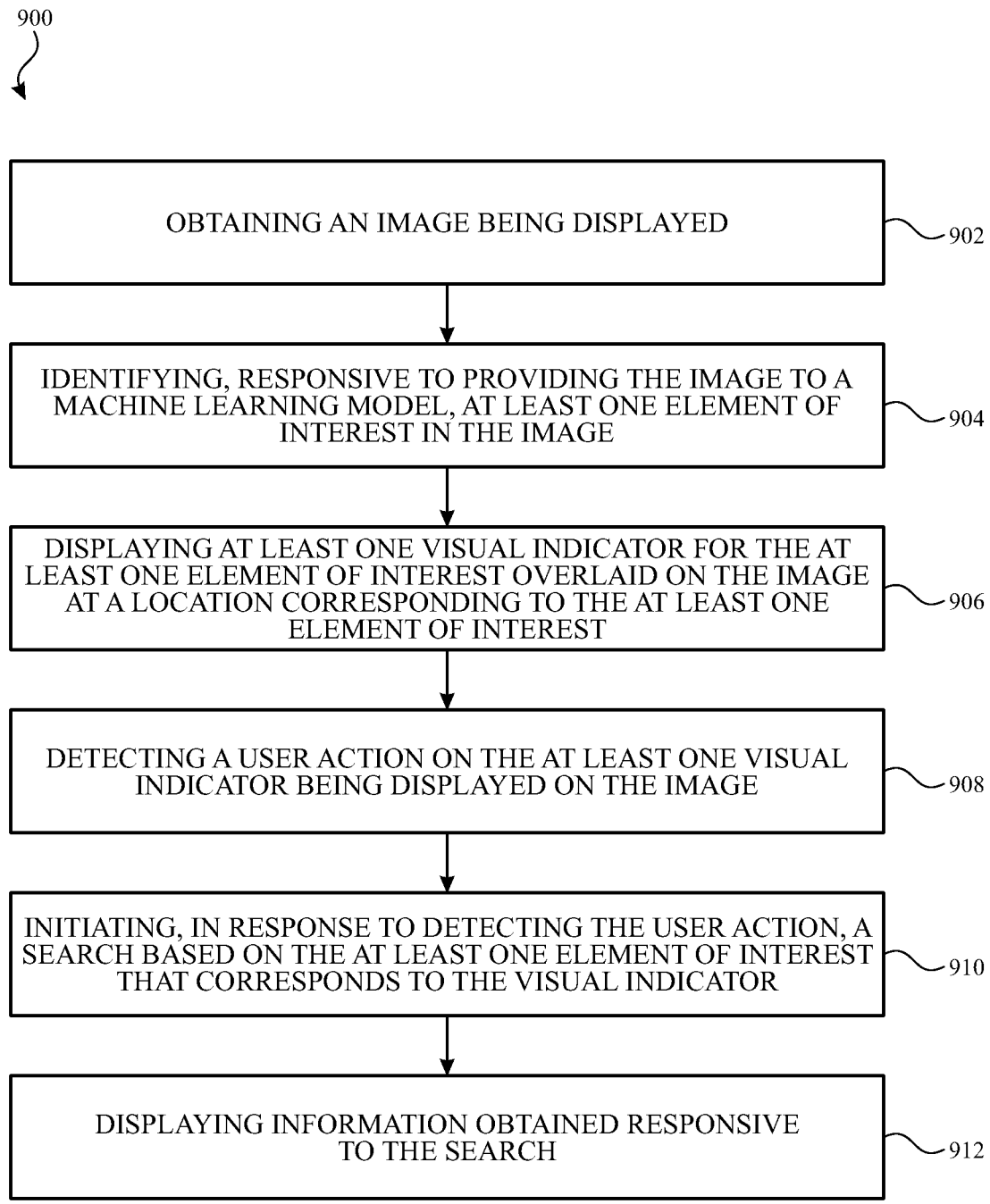
FIG. 9 illustrates a flowchart of a method for visual search in accordance with one or more implementations of the subject technology.

FIG. 9 illustrates a flowchart of a process 900 in accordance with one or more implementations of the subject technology. In an example, the process 900 may be implemented by the system 200. In an example, the process 900 may be implemented in a single computing device, for example, the computing device 110. In another example, the process 900 may be implemented in a distributed manner, without departing from the spirit and scope of the present subject matter. Furthermore, details of the operations of the process 900 which are already described herein in the above figures (e.g., FIGS. 3 and 4) are not included in detail in the description of the process 900. Furthermore, the operations of the process 900 described herein may be implemented at the least by one or more components, for example, the processor 202, of the system 200. Further for explanatory purposes, some of the blocks of the process 900 are described herein as occurring in serial, or linearly. However, multiple blocks of the process 700 may occur in parallel. In addition, the blocks of the process 900 need not be performed in the order shown and/or one or more blocks of the process 900 need not be performed and/or can be replaced by other operations.

At block 902, the process 900 includes obtaining an image being displayed. In an example, the obtained image is the one which is being displayed on a display of a computing device (e.g., by an application running at the computing device). Images may be obtained by a system process from any of several applications (e.g., web browsers, social media applications, health applications, widgets, media player applications, mail applications, etc.) that display images.

At block 904, the process 900 includes detecting, responsive to providing the image to a machine learning model, at least one element of interest in the image. The element of interest, in an example, may be an object, text, or region of interest present in the image.

In one or more implementations, the detecting the at least one element of interest at block 904 is performed locally at the computing device (e.g., using the machine learning model). In an example, detecting the at least one element of interest may further comprise identifying elements in the image and subsequently determining a rank for each of the elements. Based on the ranks of the elements, the process 900 further includes determining the at least one element of interest from the elements.

In a further example, for each of the elements, one or more domains may also be identified. The domains may also be ranked and, in an example implementation, the ranks of the one or more domains are also used for determining the at least one element of interest.

At block 906, the process 900 includes displaying at least one visual indicator for the at least one element of interest on the image at or around a location corresponding to the at least one element of interest. In an example, the at least one visual indicator is overlaid on the image at or near the location of the element of interest. In an example, the at least one visual indicator is selectable and upon selection, the information corresponding to the at least one element of interest may be presented on the display.

At block 908, the process 900 includes detecting a user action on the at least one visual indicator being displayed on the image. In an example, the user action may be a different action than the simple selection of the visual indicator based on which the information is obtained. For example, the user action may be a long press on the at least one visual indicator.

At block 910, the process 900 includes initiating, in response to detecting the user action, a search based on the at least one element of interest that corresponds to the at least one visual indicator. In an example, the search may be a quick search performed locally at the computing device and/or a detailed or comprehensive search performed by a remote server such as a backend server.

At block 912, the process 900 includes displaying information obtained responsive to the search. The information may include, but may not be limited or restricted to, a description or synopsis of the element of the interest and one or more selectable elements, such as links to other applications or websites (e.g., third-party applications or websites) that contains further information associated with the element of interest. In one example, the element of interest may be a product and said selectable element may be a link to an e-commerce application or website to purchase, loan, bid on, or rent the product or similar products. In another example, the element of interest may be a software or a piece of music (e.g., a song or an album) and said selectable element may be a link to a third-party application or a website to buy or download the software or the piece of music. In an example, the information may include, or may be, the results of the search performed by the computing device and/or the remote server (e.g., backend server).

Figure 10:
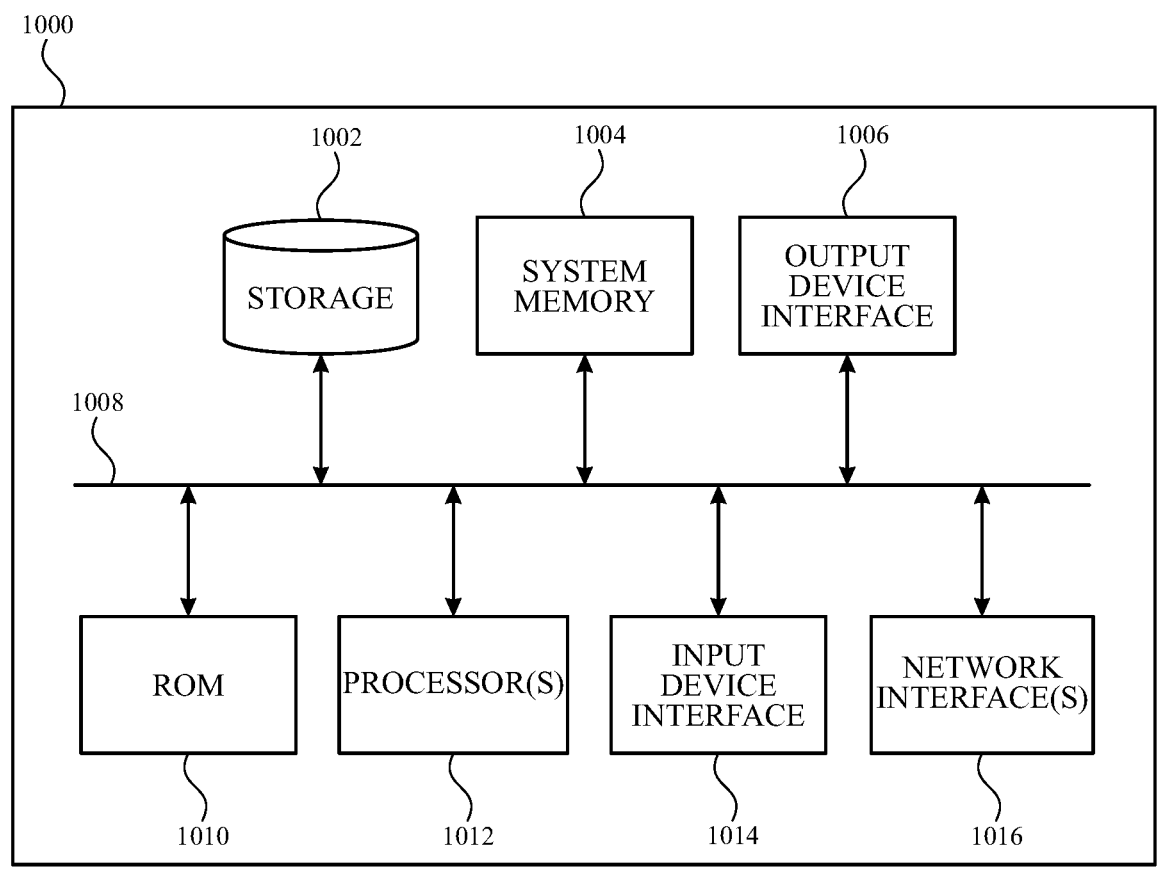
FIG. 10 illustrates a computing-device based implementation of the system of FIG. 2 in accordance with one or more implementations of the subject technology.

FIG. 10 depicts a computing-device based implementation of the system of FIG. 2 in accordance with one or more implementations of the subject technology. The system 1000 can be, and/or can be a part of, the computing device 110, the computing device 602, and/or the server 120 shown in FIG. 1. The system 1000 may include various types of computer readable media and interfaces for various other types of computer readable media. The system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject technology. The one or more processing unit(s) 1012 can be a single processor or a multi-core processor in different implementations.

The ROM 1010 stores static data and instructions that are needed by the one or more processing unit(s) 1012 and other modules of the system 1000. The permanent storage device 1002, on the other hand, may be a read-and-write memory device. The permanent storage device 1002 may be a non-volatile memory unit that stores instructions and data even when the system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject technology are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the system 1000. Input devices that may be used with the input device interface 1014 may include, for example, alphanumeric keyboards and pointing devices (also called "cursor control devices"). The output device interface 1006 may enable, for example, the display of images generated by system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the system 1000 to one or more networks and/or to one or more network nodes, such as the computing device 110 shown in FIG. 1, through the one or more network interface(s) 1016. In this manner, the system 1000 can be a part of a network of computers (such as a LAN, a wide area network ("WAN"), or an Intranet, or a network of networks, such as the Internet. Any or all components of the system 1000 can be used in conjunction with the subject technology.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

The present disclosure recognizes that the use of personal information data, in the present technology, can be used to the benefit of users. For example, the personal information can be used in performing visual search operation. Further, other uses for personal information data that benefit the user are also contemplated by the present disclosure. For instance, image data, health and fitness data, location data, or the like may be exchanged and used for visual search operations.

The present disclosure contemplates that those entities responsible for the collection, analysis, disclosure, transfer, storage, or other use of such personal information data will comply with well-established privacy policies and/or privacy practices. In particular, such entities would be expected to implement and consistently apply privacy practices that are generally recognized as meeting or exceeding industry or governmental requirements for maintaining the privacy of users. Such information regarding the use of personal data should be prominently and easily accessible by users and should be updated as the collection and/or use of data changes. Personal information from users should be collected for legitimate uses only. Further, such collection/sharing should occur only after receiving the consent of the users or other legitimate basis specified in applicable law. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations which may serve to impose a higher standard. For instance, in the US, collection of or access to certain health data may be governed by federal and/or state laws, such as the Health Insurance Portability and Accountability Act (HIPAA); whereas health data in other countries may be subject to other regulations and policies and should be handled accordingly.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of visual search operation, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing identifiers, controlling the amount or specificity of data stored (e.g., collecting location data at city level rather than at an address level), controlling how data is stored (e.g., aggregating data across users), and/or other methods such as differential privacy.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

In accordance with aspects of the disclosure, a method is provided that includes obtaining an image being displayed by an application, detecting, in response to providing the image to a machine learning model, an element of interest in the image, and displaying a visual indicator for the element of interest overlaid on the image at a location corresponding to the element of interest. The visual indicator is selectable to cause a display of information associated with the element of interest.

In accordance with other aspects of the subject technology, a system is provided that includes a processor; and a memory device containing instructions, which when executed by the processor, cause the processor to: obtain an image being displayed by an application, detect, in response to providing the image to a machine learning model, an element of interest in the image, and display a visual indicator for the element of interest overlaid on the image at a location corresponding to the element of interest. The visual indicator is selectable to cause a display of information associated with the element of interest.

In accordance with other aspects of the subject technology, a non-transitory machine-readable medium is provided that includes code that, when executed by a processor, causes the processor to perform a method, the method including obtaining an image being displayed by an application, detecting, in response to providing the image to a machine learning model, an element of interest in the image, and displaying a visual indicator for the element of interest overlaid on the image at a location corresponding to the element of interest. The visual indicator is selectable to cause a display of information associated with the element of interest.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation, or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "example" or "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject disclosure.

What is claimed is:

1. A method, comprising:
    obtaining, by a system process of a computing device, an image being displayed by an application at the computing device;
    identifying, by the system process and responsive to providing the image to one or more machine learning models at the computing device, an element of interest in the image, the identifying further comprising:
        identifying a plurality of elements in the image using the one or more machine learning models;
        ranking the plurality of elements based on a ranking algorithm; and
        based on the ranking, determining the element of interest, from amongst the plurality of elements; and
    displaying a visual indicator for the element of interest overlaid on the image at a location corresponding to the element of interest, wherein the visual indicator is selectable to cause a display of information associated with the element of interest.

2. The method of claim 1, further comprising:
    detecting a user action associated with the visual indicator;
    in response to detecting the user action, initiating a search based on the element of interest at a server;
    obtaining the information associated with the element of interest in response to the search initiated at the server; and
    displaying the information responsive to selection of the visual indicator.

3. The method of claim 2, further comprising predicting whether the search based on the element of interest can be performed at the server, wherein the search is initiated at the server after it is determined that the search can be performed at the server.

4. The method of claim 1, further comprising:
    detecting a user action associated with the visual indicator;
    in response to detecting the user action, initiating a search based on the element of interest at the computing device;

obtaining the information associated with the element of interest in response to the search initiated at the computing device; and displaying the information responsive to selection of the visual indicator.

5. The method of claim 1, wherein the information associated with the element of interest comprises at least one of a description of the element of interest and a selectable element that, when selected, causes display of another application or website.

6. The method of claim 5, wherein the element of interest is a product and the selectable element is a link to an e-commerce application or website listing the product for purchase.

7. The method of claim 1, wherein identifying the element of interest in the image further comprises:
   determining one or more domains associated with each of the plurality of elements, using the one or more machine learning models;
   ranking the one or more domains based on another ranking algorithm; and
   determining the element of interest based on ranks associated with the plurality of elements and ranks associated with the one or more domains.

8. The method of claim 1, wherein the element of interest has a rank within a predetermined prominent element ranking range.

9. The method of claim 1, further comprising obtaining the information associated with the element of interest from a server, wherein the information is obtained from the server based on a rank assigned to the element of interest or to one or more domains associated with the element of interest.

10. The method of claim 1, wherein the computing device comprises a camera, wherein the application is a camera application, wherein the image is a live preview of a field of view of the camera and the visual indicator is an annotation over the live preview at the location associated with the element of interest in the field of view of the camera.

11. The method of claim 1, wherein the element of interest is an object of interest, a region-of-interest (ROI), or a text of interest in the image.

12. A system comprising:
   a processor; and
   a memory device containing instructions, which when executed by the processor, cause the processor to:
      obtain, by a system process of a computing device, an image being displayed by an application at the computing device;
      identify, by the system process and responsive to providing the image to one or more machine learning models at the computing device, an element of interest in the image, the identify further comprising:
         identify a plurality of elements in the image using the one or more machine learning models;
         rank the plurality of elements based on a ranking algorithm; and
         based on the ranking, determine the element of interest, from amongst the plurality of elements; and
      display a visual indicator for the element of interest overlaid on the image at a location corresponding to the element of interest, wherein the visual indicator is selectable to cause a display of information associated with the element of interest.

13. The system of claim 12, wherein the memory device contains further instructions, which when executed by the processor, cause the processor to:
   detect a user action associated with the visual indicator;
   in response to detecting the user action, initiate a search based on the element of interest at a server;
   obtain the information associated with the element of interest in response to the search initiated at the server; and
   display the information responsive to selection of the visual indicator.

14. The system of claim 12, wherein the memory device contains further instructions for identifying the element of interest in the image, which when executed by the processor, cause the processor to:
   determine one or more domains associated with each of the plurality of elements, using the one or more machine learning models;
   rank the one or more domains based on another ranking algorithm; and
   determine the element of interest based on ranks associated with the plurality of elements and ranks associated with the one or more domains.

15. The system of claim 12, wherein the computing device comprises a camera, wherein the application is a camera application, wherein the image is a live preview of a field of view of the camera and the visual indicator is an annotation over the live preview at the location associated with the element of interest in the field of view of the camera.

16. The system of claim 12, wherein the element of interest is an object of interest, a region-of-interest (ROI), or a text of interest in the image.

17. A non-transitory machine-readable medium comprising instructions that, when executed by a processor, causes the processor to perform operations comprising:
   obtaining, by a system process of a computing device, an image being displayed by an application at the computing device;
   identifying, by the system process and responsive to providing the image to one or more machine learning model at the computing device, an element of interest in the image, the identifying further comprising:
      identifying a plurality of elements in the image using the one or more machine learning models;
      ranking the plurality of elements based on a ranking algorithm; and
      based on the ranking, determining the element of interest, from amongst the plurality of elements; and
   displaying a visual indicator for the element of interest overlaid on the image at a location corresponding to the element of interest, wherein the visual indicator is selectable to cause a display of information associated with the element of interest.

18. The non-transitory machine-readable medium of claim 17, the operations further comprise:
   detecting a user action associated with the visual indicator;
   in response to detecting the user action, initiating a search based on the element of interest at a server;
   obtaining the information associated with the element of interest in response to the search initiated at the server; and
   displaying the information responsive to selection of the visual indicator.

19. The non-transitory machine-readable medium of claim 17, wherein the computing device comprises a camera, wherein the application is a camera application, wherein the image is a live preview of a field of view of the camera and the visual indicator is an annotation over the live preview at the location associated with the element of interest in the field of view of the camera.

20. The non-transitory machine-readable medium of claim 17, wherein the element of interest is an object of interest, a region-of-interest (ROI), or a text of interest in the image.

\* \* \* \* \*

UNITED STATES PATENT AND TRADEMARK OFFICE
CERTIFICATE OF CORRECTION

PATENT NO. : 11,961,291 B2
APPLICATION NO. : 17/528157
DATED : April 16, 2024
INVENTOR(S) : Lukas A. Bossard et al.

It is certified that error appears in the above-identified patent and that said Letters Patent is hereby corrected as shown below:

On the Title Page

Under (56) References Cited; Other Publications:

Please replace: "Digital Trands, https://www.youtube.com/watch?v~h_n YU9OVCZk &t~22ls, Jun. 18, 2019 (Year: 2019).*"

With: --Digital Trends, https://www.youtube.com/watch?v~h_n YU9OVCZk &t~22ls, Jun. 18, 2019 (Year: 2019).*--.

Signed and Sealed this
Ninth Day of July, 2024

Katherine Kelly Vidal
*Director of the United States Patent and Trademark Office*